(12) United States Patent
Ptak

(10) Patent No.: US 6,397,988 B1
(45) Date of Patent: Jun. 4, 2002

(54) PIVOTING VIBRATION ABSORBER INCLUDING A TORSIONAL SPRING AND PIPELINE SYSTEM UTILIZING SAME

(75) Inventor: Keith R. Ptak, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/513,420

(22) Filed: Feb. 25, 2000

(51) Int. Cl.[7] .................................................. F16F 7/10
(52) U.S. Cl. ....................... 188/380; 181/208; 210/144; 174/42; 267/150
(58) Field of Search .............................. 188/378, 379, 188/380, 130; 248/74.1, 74.2; 181/208; 210/144; 174/42; 267/150

(56) References Cited

U.S. PATENT DOCUMENTS

| | | | | |
|---|---|---|---|---|
| 1,901,860 A | * | 3/1933 | Austin | 174/42 |
| 2,271,935 A | * | 2/1942 | Buchanan | 174/42 |
| 2,352,318 A | * | 6/1944 | Guarnaschelli | 175/42 |
| 2,694,101 A | * | 11/1954 | Shuhart | 174/42 |
| 3,288,419 A | | 11/1966 | Wallerstein, Jr. | 248/358 |
| 3,322,379 A | | 5/1967 | Flannelly | 248/20 |
| 3,388,772 A | | 6/1968 | Marsh et al. | 188/1 |
| 3,432,610 A | * | 3/1969 | Claren | 174/42 |
| 3,446,907 A | * | 5/1969 | Bouche | 188/379 |
| 3,490,556 A | | 1/1970 | Bennett, Jr. et al. | 181/33 |
| 3,668,939 A | | 6/1972 | Schrader | 74/61 |
| 3,711,624 A | | 1/1973 | Dulhunty | 174/42 |
| 3,767,181 A | | 10/1973 | van der Burgt et al. | 267/136 |
| 3,778,527 A | * | 12/1973 | Nigol | 174/42 |
| 4,011,397 A | * | 3/1977 | Bouche | 174/42 |
| 4,097,958 A | * | 7/1978 | Van Dell | 16/128.1 |
| 4,159,393 A | | 6/1979 | Duihunty | 174/42 |
| 4,230,291 A | | 10/1980 | Marshall, II | 244/17.11 |
| 4,523,053 A | * | 6/1985 | Rawlins | 174/42 |
| 4,576,356 A | | 3/1986 | Kucera | 248/559 |
| 4,697,781 A | | 10/1987 | Hamano et al. | 248/559 |
| 4,716,986 A | | 1/1988 | Umemoto et al. | 181/207 |
| 4,852,848 A | * | 8/1989 | Kucera | 248/559 |
| 5,052,530 A | * | 10/1991 | Shimazaki | 188/379 |
| 5,072,801 A | | 12/1991 | Freymann et al. | 180/68.5 |
| 5,193,644 A | | 3/1993 | Hart et al. | 181/207 |
| 5,660,406 A | * | 8/1997 | Menze, Sr. | 280/276 |
| 5,921,568 A | * | 7/1999 | Cruise et al. | 280/124.134 |
| 6,129,177 A | * | 10/2000 | Gwinn | 181/207 |

* cited by examiner

Primary Examiner—Christopher P. Schwartz
Assistant Examiner—Benjamin A Pezzlo
(74) Attorney, Agent, or Firm—Michael M. Gnibus; Robert W. Glatz

(57) ABSTRACT

Vibration absorbers are provided which utilize a torsional spring and a dynamic mass to control vibrations that occur within the structure to which they are attached. Additionally, pipeline systems are provided which utilize such vibration absorbers including a mass and a torsional spring to control the vibrations that occur within the pipeline system. In various embodiments of the present invention, the torsional spring is one or more elastomer elements coupled between the dynamic mass and a support frame to produce a spring force responsive to pivotal rotation of the dynamic mass relative to the support frame. In various embodiments, one or more elastomer elements arranged in series or in parallel may be used as the torsional spring to provide a desired vibratory dampening characteristic for applications, such as pipelines. Use of such torsional springs may provide a more simplified design with less mechanical joints which may be less susceptible to failure in harsh environments.

25 Claims, 7 Drawing Sheets

PIVOTING VIBRATION ABSORBER INCLUDING A TORSIONAL SPRING AND PIPELINE SYSTEM UTILIZING SAME

FIELD OF INVENTION

The present invention relates to vibration control systems, and more particularly to vibration absorbers for reducing structural vibrations.

BACKGROUND OF INVENTION

Vibration absorbers generally include a mass coupled with a spring and are used to control vibrations that occur within the member to which they are attached. They are typically resonant devices and their natural frequencies are generally tuned to coincide with a predominant disturbance frequency of the vibrating member. Examples of vibration absorbers may be found in U.S. Pat. Nos. 3,288,419; 3,322,379; 3,388,772; 3,490,556; 3,668,939; 3,767,181; 4,230,291; 4,697,781; 4,852,848; 5,052,530 and 5,072,801.

One known beneficial application of vibration absorbers is on above-ground pipelines. Pipelines are often used to transfer fluids, such as oil and natural gas, across large distances. In many instances, these pipelines are installed above-ground by suspending the pipeline on spaced-apart supports. Pipelines, however, may be susceptible to damage from vibrations that may occur due to such things as wind-induced vortex shedding and earthquakes. An example of an application of a vibration absorber to a pipeline is described in U.S. Pat. No. 5,193,644 to Hart et al. Hart et al. describes a vibration damper that includes a mass suspended from a pipeline by interconnected damper members which generally act as a linear spring. Other examples of a vibration absorbers used in conjunction with a pipe are found in U.S. Pat. Nos. 4,576,356 and 4,716,986.

SUMMARY OF INVENTION

According to the present invention, vibration absorbers are provided which utilize a torsional spring and a dynamic mass to control vibrations that occur within a structure to which they are attached. Additionally, pipeline systems are provided which utilize such vibration absorbers to control vibrations that occur within the pipeline system. In various embodiments of the present invention, the torsional spring is one or more elastomer elements connected between the dynamic mass and a support frame to produce a spring force responsive to pivotal rotation of the dynamic mass relative to the support frame. In various embodiments, one or more elastomer elements arranged in series or in parallel may be used as the torsional spring to provide a desired vibratory dampening characteristic for applications, such as pipelines. Use of such torsional springs may provide a more simplified design with less mechanical joints which may be less susceptible to failure in harsh environments.

In embodiments of the present invention, the vibration absorber includes a support frame, a dynamic mass pivotally connected to the support frame for movement about a pivotal axis and a torsional spring connected between the dynamic mass and the support frame that provides a spring force responsive to pivotal rotation of the dynamic mass relative to the support frame. The torsional spring may be positioned along the pivotal axis. The torsional spring may be a coil spring or an elastomer element. The elastomer element may include a elastomeric disc. The elastomeric disc may be made from a material selected from the group consisting of natural rubber elastomer, synthetic elastomer or a blend of natural rubber elastomer and synthetic elastomer.

In other embodiments of the present invention, the support frame includes a first side member and a second side member offset from the first side member along the pivotal axis. The dynamic mass may be positioned between the first side member and the second side member along the pivotal axis.

In further embodiments of the present invention, the elastomer element further includes a first plate. The first plate may be connected to the elastomeric disc between the elastomeric disc and the first side member along the pivotal axis. The first plate may be connected to the first side member at a radial position offset from the pivotal axis. The first side member may include a slot configured to provide selectable rotational orientation of the dynamic mass relative to the support frame.

In still further embodiments of the present invention, the dynamic mass includes an arm and an adjustment mass movably mounted on the arm. The adjustment mass may include a plurality of metal plates. The arm may include a channel having a track formed therein such that the adjustment mass may be moved along the track to adjust a dynamic characteristic of the vibration absorber. The elastomer element may be connected between the first side member and the arm. The elastomer element may include a second plate that may be connected to the elastomeric disc. The second plate may also be connected to the side of the arm.

In still further embodiments of the present invention, the torsional spring further includes a second elastomer element connected between the second side member and the arm. The second elastomer element may, alternatively, be connected between the first elastomer element and the arm.

In still other embodiments of the present invention, the vibration absorber includes a support frame including a first side member and a second side member offset from the first side member, a dynamic mass pivotally connected to the support frame for movement about a pivotal axis, and an elastomer element connected between the dynamic mass and the support frame that provides a spring force responsive to pivotal rotation of the dynamic mass relative to the support frame. The elastomer element and the dynamic mass may be positioned between the first side member and the second side member along the pivotal axis. The vibration absorber may include a plurality of elastomer elements positioned between the first side member and the second side member along the pivotal axis. The elastomer elements may all be connected between the first side member and the arm. Alternatively, at least one elastomer element may be connected between the first side member and the arm and at least one elastomer element may be connected between the second side member and the arm.

In still further embodiments of the present invention, the vibration-reduced pipeline system includes a pipeline section and a vibration absorber connected to the pipeline section. The vibration absorber may include a support frame connected to the pipeline section, a dynamic mass pivotally connected to the support frame for movement about a pivotal axis, and a torsional spring connected between the dynamic mass and the support frame that provides a spring force responsive to pivotal rotation of the dynamic mass relative to the support frame.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein. Instead, these embodiments are provided so that this disclosure will be thorough and complete, and will fully convey the scope of the invention to those skilled in the art. It will be understood that when an element such as an arm, elastomer element or side member is referred to as being "connected to" another element, it can be directly connected to the other element or intervening elements may also be present. In contrast, when an element is referred to as being "directly connected to" another element, there are no intervening elements present. Like numbers refer to like elements throughout.

Figure 1:
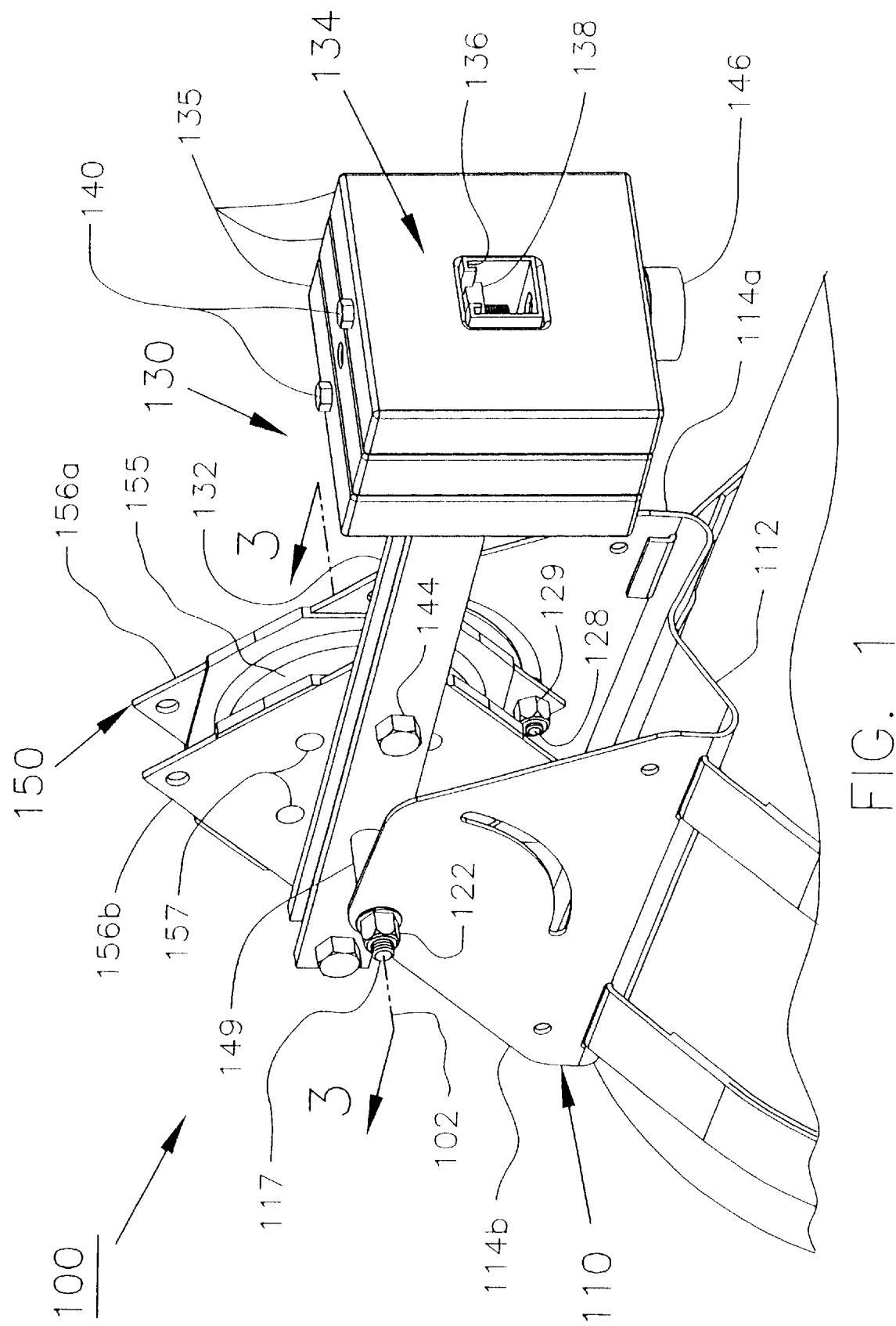
FIG. 1 is a perspective view of embodiments of a vibration absorber of the present invention.
Figure 2:
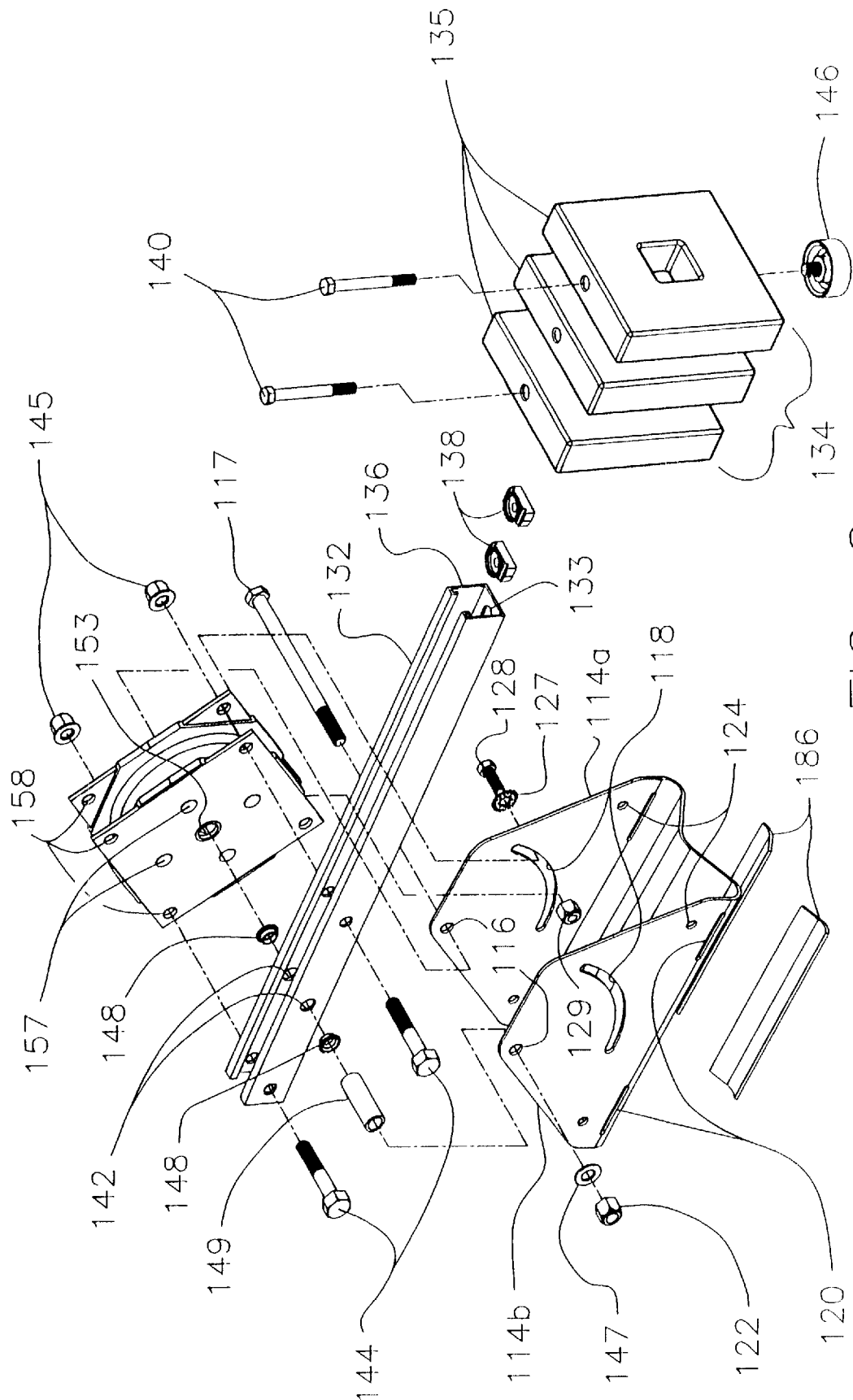
FIG. 2 is an exploded perspective view of the vibration absorber of FIG. 1.

With reference to FIGS. 1 and 2, one embodiment of a vibration absorber 100 according to the present invention will now be described. The illustrated vibration absorber 100 includes a support frame 110 and a dynamic mass 130 movably, preferably pivotally, connected to the support frame 110 for movement about a pivotal axis 102. While pivotal mounting and rotation are preferred, the arm 132 may be connected to an end of the torsional spring 150 opposite an end of the torsional spring 150 connected to the support frame thereby resulting in a variety of movement components of the arm 132, at least one of which includes a rotational component relative to a pivotal axis of the torsional spring 150. The dynamic mass 130 in the illustrated embodiment of FIG. 1 includes an arm 132 and an adjustment mass 134. A torsional spring 150 is coupled between the dynamic mass 130 and the support frame 110. The torsional spring 150 provides a spring force responsive to pivotal rotation of the dynamic mass 130 relative to the support frame 110 about the pivotal axis 102.

The support frame 110 in the illustrated embodiment includes a base portion 112 and side members 114a, 114b extending therefrom. The side members 114a, 114b each include a hole 116 positioned along, and substantially centered about, the pivotal axis 102 and configured to receive a shaft 117. The shaft 117 may be a rod threaded at each end or a bolt threaded at one end and may be secured in position by a nut 122. However, the shaft 117 may be retained in position to define the pivotal axis 102 by other means generally known to those of skill in the art such as riveting, welding, retaining rings, cotter pins, spring pins, etc.

Preferably, at least one of the side members 114a, 114b further includes a means for providing selectable rotational orientation of the dynamic mass 130 relative to the support frame 110. This allows the initial angular orientation of the dynamic mass 130 to be set as desired and further may provide for repositioning of the angular orientation of the dynamic mass 130 to accommodate spring drift in the torsional spring 150 that may occur, for example, due to stress relaxation. Preferably, the means for providing selectable rotational orientation of the dynamic mass 130 relative to the support frame 110 is a semi-circular slot 118. Other means for providing selectable rotational orientation of the dynamic mass 130 relative to the support frame 110, such as individual holes, a gear system, cams or clamps, will be apparent to those of skill in the art and are included within the scope of this aspect of the present invention.

Figure 6:
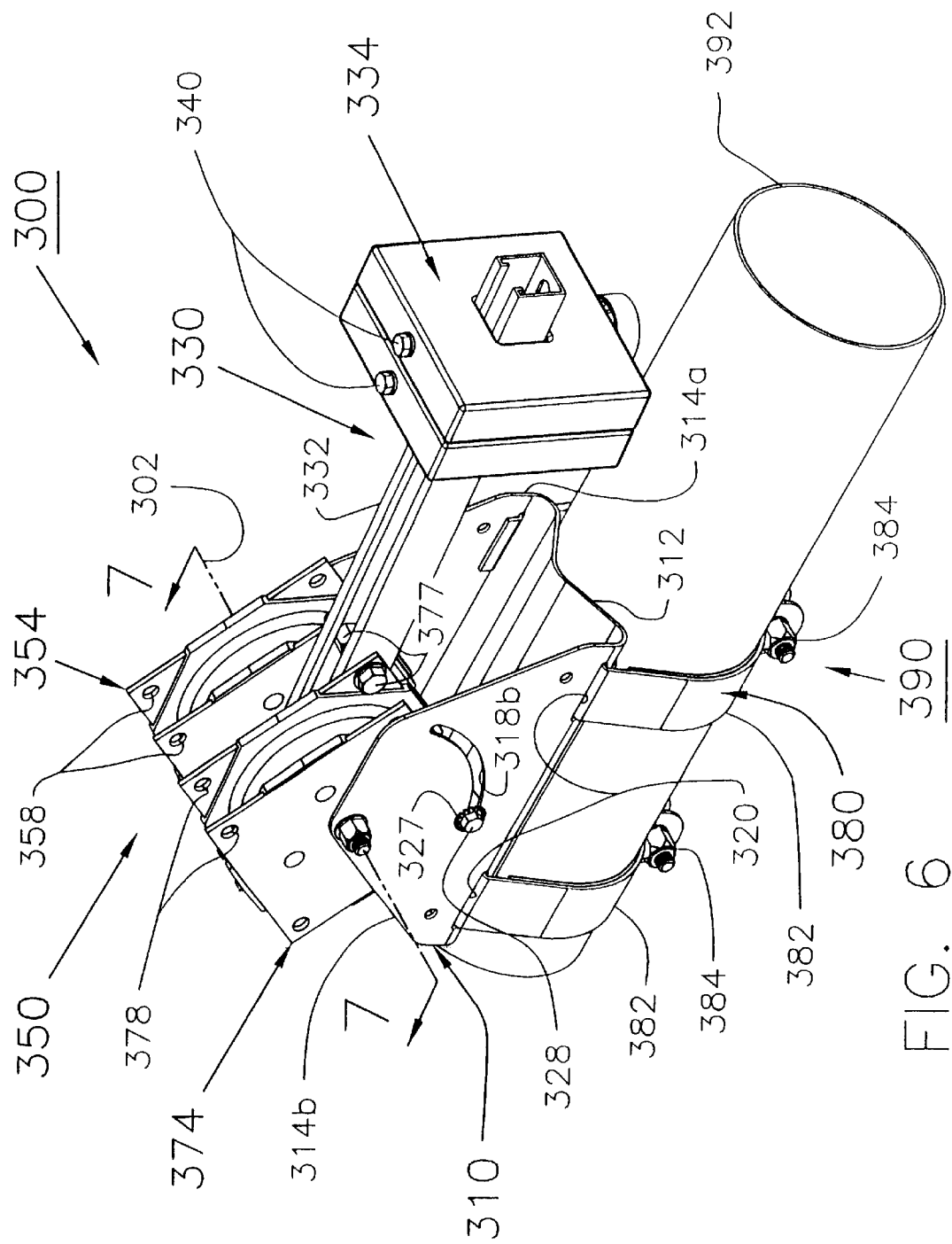
FIG. 6 is a perspective view of further embodiments of a pipeline system including a vibration absorber according to the present invention.

The side members 114a, 114b may further include slots 120 which are configured to receive straps 382 (FIG. 6) to secure the vibration absorber 100 to a structural member such as a pipeline section 392 (FIG. 6). Other suitable means for securing the vibration absorber 100 will be understood by those of skill in the art such as adhesives, welding, velcro, flexible straps with buckles or rachets, etc. The side members 114a, 114b may also include openings 124 for securing a cover which may protect the components of the vibration absorber 100 from exposure to sun, rain, snow, ice, etc. An example of such a cover is illustrated in U.S. patent application Ser. No. 09/178,003 entitled "Pivoting Tuned Vibration Absorber and System Utilizing Same," which application is hereby incorporated by reference as if fully set forth herein. Such a cover, however, need not be utilized with the present invention because, unlike previous vibration absorbers that generally have multiple pivots and more closely-spaced, moving components, various embodiments of the present invention may have only one pivot and fewer components constructed in a more open architecture. The lesser number of components and open architecture may allow the elements (such as snow and ice) to flow more freely through the components without collecting on them and the reduction in pivots may reduce the number of mechanical joints that might be adversely affected by the buildup of snow and ice.

As illustrated in FIGS. 1 and 2, the dynamic mass 130 includes an arm 132 extending away from the pivotal axis 102 and an adjustment mass 134 moveably mounted on the arm 132. Preferably, the arm 132 extends transversely, preferably perpendicularly, away from the pivotal axis 102 as illustrated in FIG. 1. The shaft 117 extends through holes 142 in the arm 132 and is configured to allow the arm 132 to pivot about the pivotal axis 102. As will be understood by those of skill in the art, in keeping with the present invention, the shaft 117 may be rigidly connected to the side members 114a, 114b or the arm 132 so long as the arm 132 remains coupled to the torsional spring 150 in a manner such that the torsional spring 150 produces a spring force when the arm 132 is rotated relative to the support frame 110.

As shown in FIGS. 1 and 2, the arm 132 comprises a channel including a track 136 formed therein. The arm 132 may include drainage openings 133 that may provide for drainage of the channel. Channel nuts 138 are slidably received in the track 136 and, together with bolts 140, secure the adjustment mass 134 to the arm 132 at a selected position. The adjustment mass 134 in the illustrated embodiment may be repositioned along the track 136 by loosening the bolts 140 slightly and sliding the adjustment mass 134 inwardly or outwardly along the arm 132 to adjust the natural frequency $f_n$, of the vibration absorber 100. However, it is to be understood that the position of the adjustment mass 134 need not be adjustable and may be pre-configured with a desired natural frequency and a fixed position. Other means for providing adjustability for the adjustment mass 134 may also be utilized including gears, clamps, friction locks, clevis pins, spring pins and other mechanisms as will be understood by those of skill in the art.

As shown in FIG. 1, the adjustment mass 134 includes a bumper 146 that may protect the pipeline section 392 (FIG. 6) from damage if contacted by the adjustment mass 134. The adjustment mass 134 may be made from a wide variety of known materials, but is preferably made from denser materials typically used for weights in order to limit the size of the adjustment mass 134. The adjustment mass 134 may, for example, be formed from cast iron. Alternatively, the arm 132 and adjustment mass 134 could be cast or formed as an integral unit. Preferably, the adjustment mass 134 is formed from one or more metal plates 135 which allows the total mass, and, thus, the natural frequency $f_n$, of the vibration absorber 100 to be adjusted by adding or removing individual metal plates 135.

Figure 3:
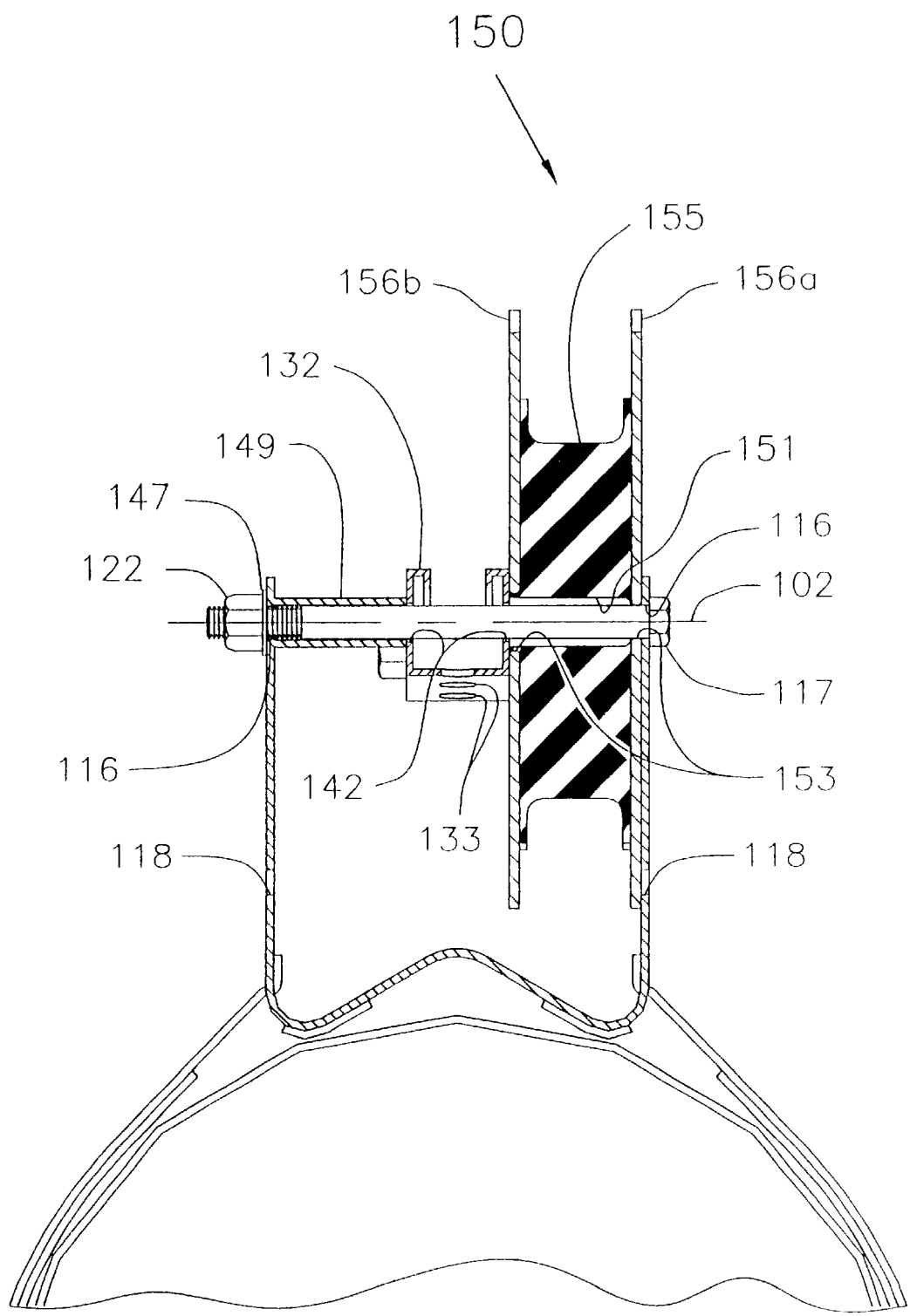
FIG. 3 is a cross-sectional view of the vibration absorber of FIG. 1 taken along line 3—3.

The torsional spring 150 as shown in FIG. 1 is positioned along the pivotal axis 102. As seen in the embodiment of FIG. 3, the torsional spring 150 is an elastomer element. The elastomer element 150 in the illustrated embodiment includes an elastomeric disc 155, a first plate 156a and a second plate 156b. The elastomeric disc 155 as shown in FIG. 3 includes a bore 151 extending longitudinally through a central portion thereof and configured to receive the shaft 117. The elastomer element 150 is preferably loaded in torsion, and, more preferably, pure torsion, about the pivotal axis 102. Alternatively, other types of torsional springs, such as coil springs, torsion bars and linear springs configured to act torsionally may be used as will be understood by those of skill in the art. In addition, springs configured to act in cocking (e.g. putting a block of elastomer material under the arm 132 which then produces a spring force when the arm 132 is forced into the elastomer material, also referred to as a spring acting in coning, or configured to act in bending) may be used as will be understood by those of skill in the art.

The first plate 156a is preferably bonded to one end of the elastomeric disc 155, and the second plate 156b is preferably bonded to an opposing end of the elastomeric disc 155 via bonding means such as injection or transfer bonding. However, as will be understood by those of skill in the art, a variety of other connecting means such as post-vulcanization bonding may also be utilized. The elastomer element 150 may be formed in part by injecting the elastomer material through the holes 157 into the region between the first plate 156a and the second plate 156b. The first and second plates 156a, 156b are preferably square and include corner holes 158 and a center hole 153. As best seen in FIG. 3, the shaft 117 is received through the hole 116 of the first side member 114a, the center hole 153 of the first plate 156a, the bore 151, the center hole 153 of the second plate 156b, the holes 142 in the arm 132, and the hole 116 of the second side member 114b to define the pivotal axis 102. As best seen in FIG. 2, the shaft 117 may also be inserted through bearings 148 positioned in the holes 142 in order to reduce the wear on the holes 142 and the shaft 117. A spacer 149 may also be used in order to limit the lateral movement of the elastomer element 150 and the dynamic mass 130 along the pivotal axis 102. A washer 147 may also be used.

Referring now to FIG. 2, the arm 132 may be attached to the second plate 156b via the corner holes 158 by fasteners such as a bolt 144 and nut 145. The bolt 128 in the illustrated embodiment is inserted through the semi-circular slot 118 of the first side member 114a and another corner hole 158 of the first plate 156a and threadedly secured by the nut 129 thus fixing the position of the first plate 156a relative to the first side member 114a. Positioning of the secured point of the bolt 128 in the semi-circular slot 118 further fixes the initial (or rest) rotational position of the arm 132 relative to the support frame 110. A washer 127 may also be used.

Figure 4:
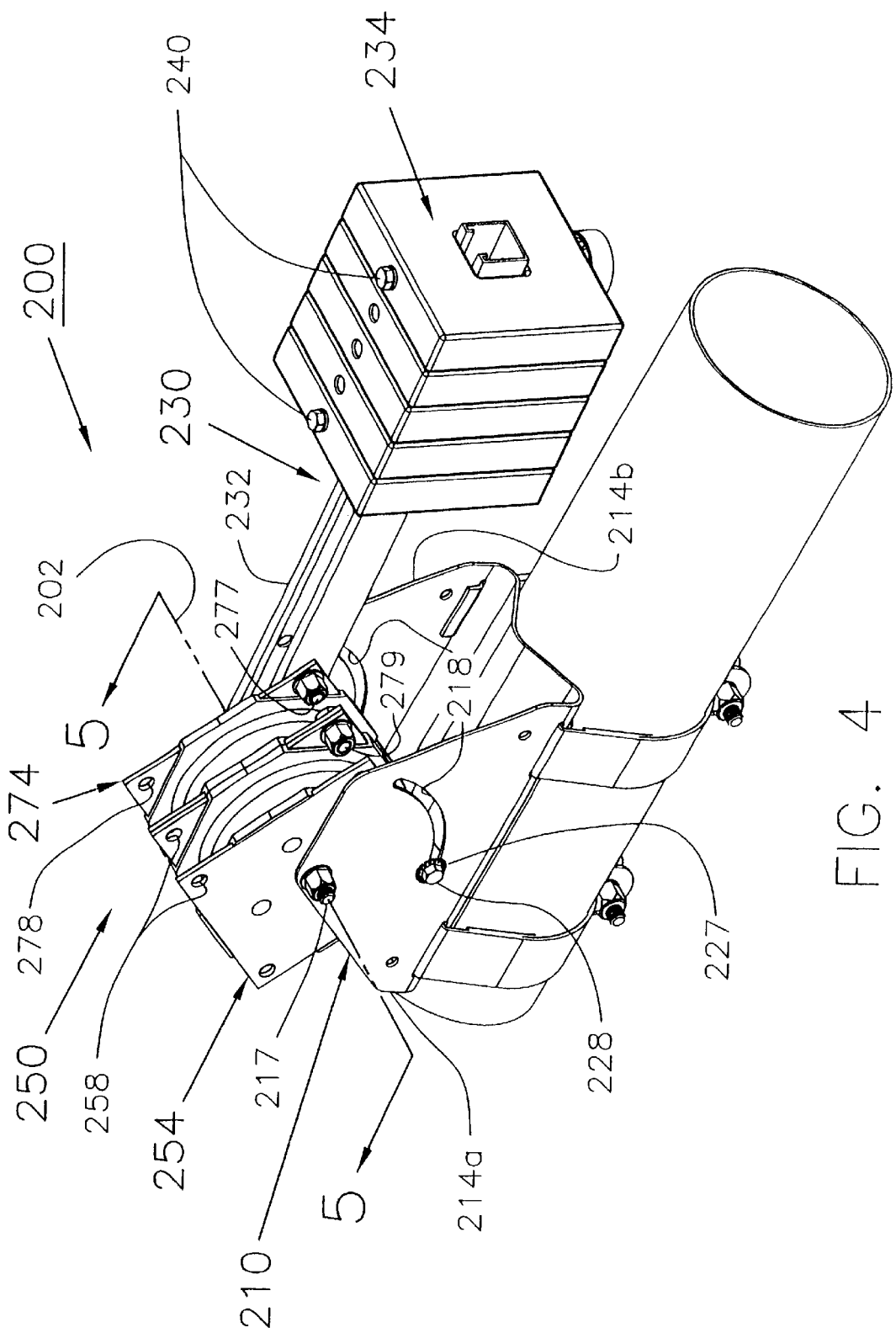
FIG. 4 is a perspective view of other embodiments of a vibration absorber according to the present invention.
Figure 5:
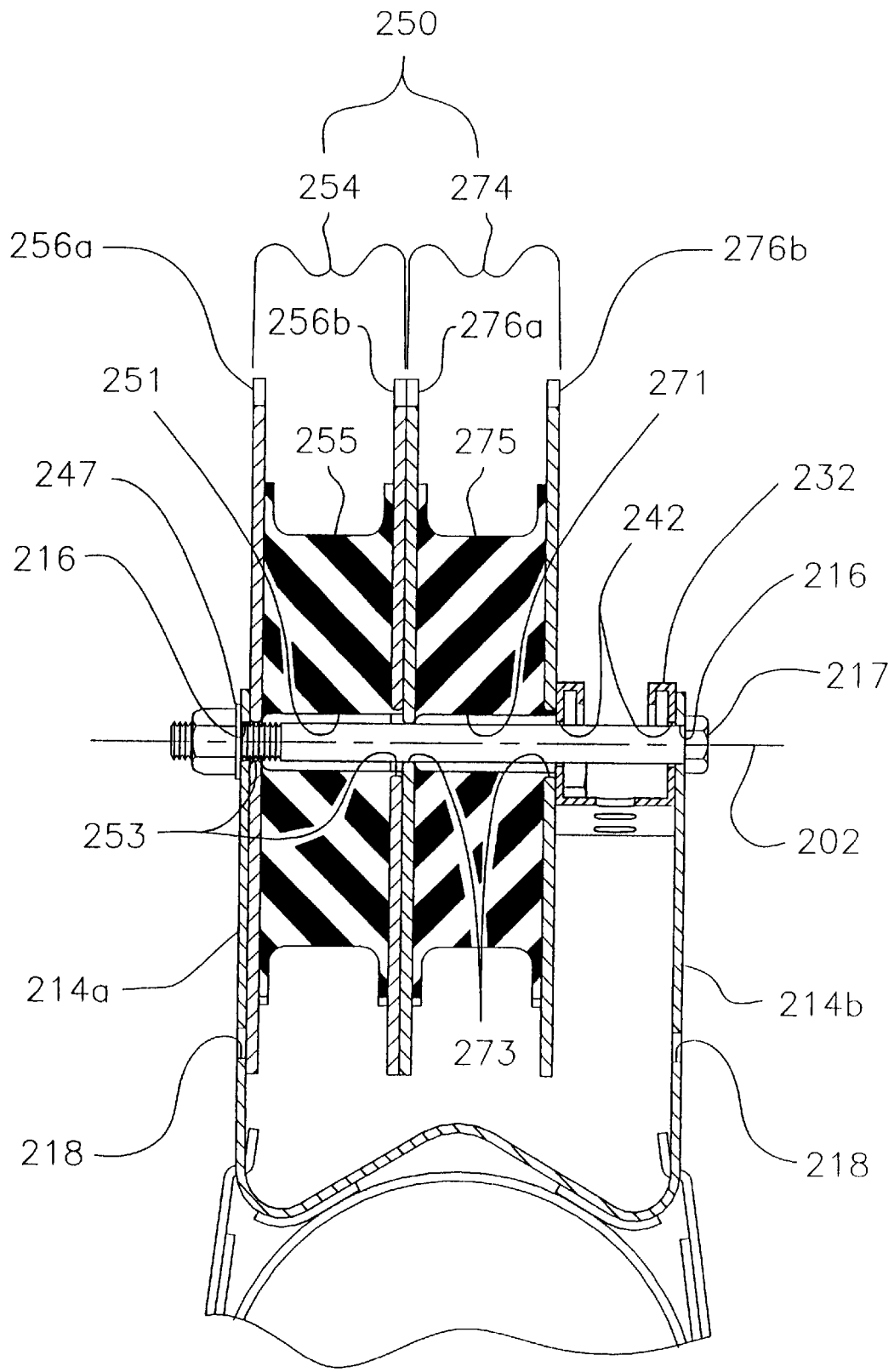
FIG. 5 is a cross-sectional view of the vibration absorber of FIG. 4 taken along line 5—5.

With reference to FIGS. 4 and 5, a vibration absorber 200 according to a further embodiment of the present invention will now be described. The vibration absorber 200 includes a support frame 210 and a dynamic mass 230 pivotally connected to the support frame 210 for movement about a pivotal axis 202. The dynamic mass 230 in the illustrated embodiment of FIG. 4 includes an arm 232 and an adjustment mass 234. A torsional spring 250 is coupled to the dynamic mass 230 and the support frame 210. The torsional spring 250 provides a spring force responsive to pivotal rotation of the dynamic mass 230 relative to the support frame 210 about the pivotal axis 202. The support frame 210, the dynamic mass 230 and the pivotal axis 202 may generally be constructed in the same manner as the support frame 110, the dynamic mass 130 and the pivotal axis 102 described above with reference to the vibration absorber 100.

In the vibration absorber 200, the torsional spring 250 is positioned along the pivotal axis 202. As shown in the illustrated embodiment, the torsional spring 250 includes a first elastomer element 254 and a second elastomer element 274. The first elastomer element 254 and the second elastomer element 274 may both be generally constructed in the same manner as the elastomer element 150 described above with reference to the vibration absorber 100.

Referring to FIGS. 4 and 5, the support frame 210 includes side members 214a, 214b. The side members 214a, 214b each include a hole 216, and at least one side member 214a, 214b includes a semi-circular slot 218. The dynamic mass 230 includes an arm 232, and the arm 232 has holes 242. The first elastomer element 254 includes an elastomeric disc 255, a first plate 256a and a second plate 256b. The elastomeric disc 255 includes a bore 251. The first and second plates 256a, 256b include corner holes 258 and a center hole 253. The second elastomer element 274 includes an elastomeric disc 275, a third plate 276a and a fourth plate 276b. The elastomeric disc 275 includes a bore 271. The third and fourth plates 276a, 276b include corner holes 278 and a center hole 273.

As best seen in FIG. 5, the shaft 217 is received through the hole 216 of the first side member 214a, the center hole 253 of the first plate 256a, the bore 251, the center hole 253 of the second plate 256b, the center hole of the third plate 276a, the bore 271, the center hole 273 of the fourth plate 276b, the holes 242 in the arm 232, and the hole 216 of the second side member 214b to define the pivotal axis 202. The shaft 217 may also be inserted through bearings positioned in the holes 242 in order to reduce the wear on the holes 242 and the shaft 217. A washer 247 may also be used.

The second plate 256b in the illustrated embodiment is secured to the third plate 276a via the corner holes 258, 278 by bolts 279. As will be appreciated by those of skill in the art, the second plate 256b and the third plate 276a could be combined into one plate thus integrating the first and second elastomer elements 254, 274 into a single assembly including two elastomer discs 255, 275. The arm 232 may be attached to the fourth plate 276b via the corner holes 278 by fasteners 277. The bolt 228 in the illustrated embodiment is inserted through the semi-circular slot 218 and another corner hole 258 of the first plate 256a and threadedly secured by a nut thus fixing the position of the first plate 256a relative to the first side member 214a. A washer 227 may also be used. Positioning of the secured point of bolt 228 in the semi-circular slot 218 further fixes the initial (or rest) rotational position of the arm 232 relative to the support frame 210.

The elastomer elements 254, 274 in the vibration absorber 200 are in series as that term is used herein. Assuming substantially identical elastomer elements, using multiple elastomer elements in series may produce a vibration absorber with a lower range of possible natural frequencies $f_n$ than a vibration absorber that uses only one such elastomer element (e.g., vibration absorber 100). This is the expected result as connecting elastomer elements in series generally provides a softer effective spring rate than an individual elastomer element.

Figure 7:
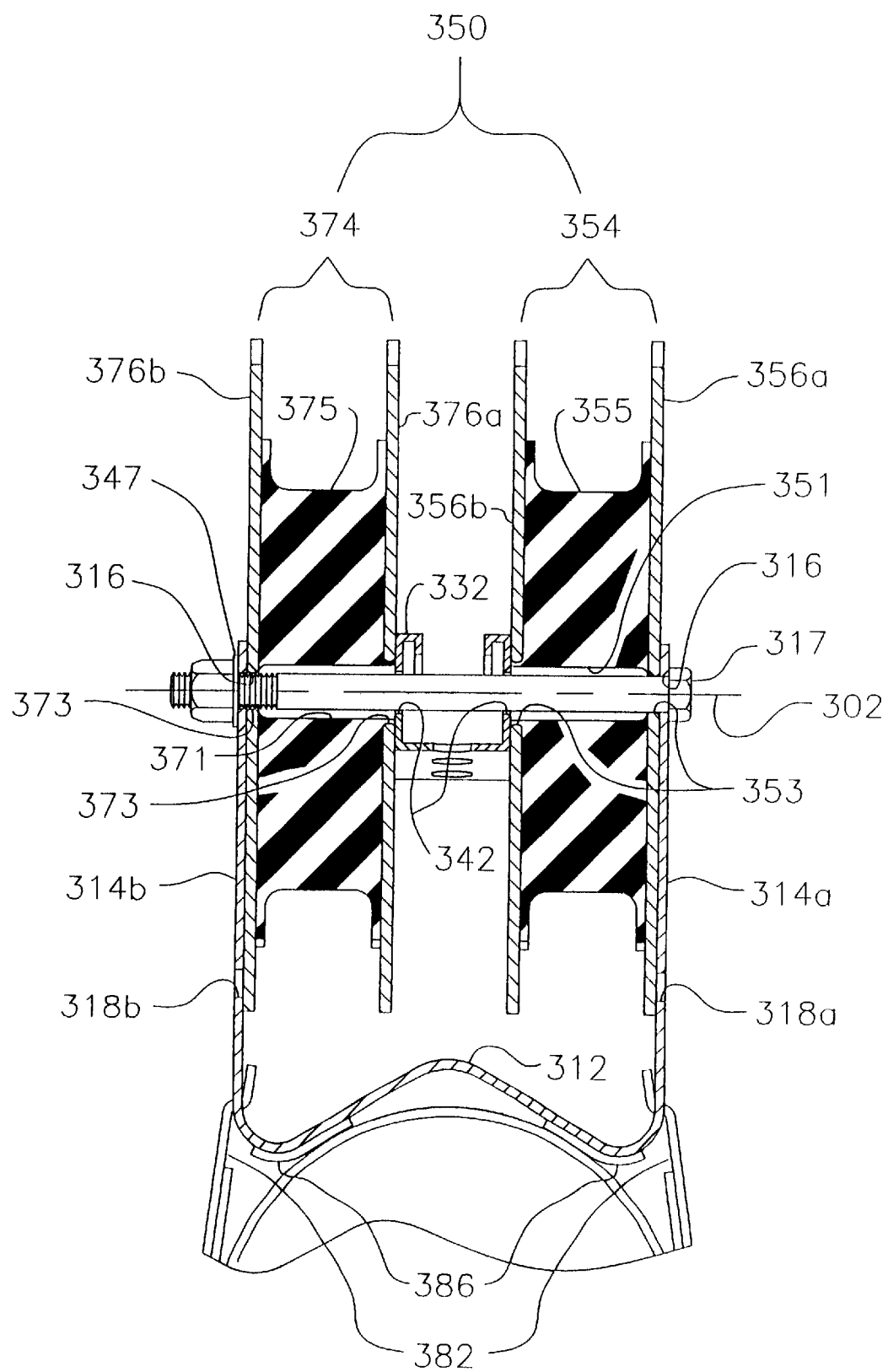
FIG. 7 is a cross-sectional view of the vibration absorber of FIG. 6 taken along line 7—7.

With reference to FIGS. 6 and 7, a vibration absorber 300 according to a further embodiment of the present invention will now be described. The vibration absorber 300 includes a support frame 310 and a dynamic mass 330 pivotally connected to the support frame 310 for movement about a pivotal axis 302. The dynamic mass 330 in the illustrated embodiment of FIG. 6 includes an arm 332 and an adjustment mass 334. A torsional spring 350 is coupled to the dynamic mass 330 and the support frame 310. The torsional spring 350 provides a spring force responsive to pivotal rotation of the dynamic mass 330 relative to the support frame 310 about the pivotal axis 302. The support frame 310, the dynamic mass 330 and the pivotal axis 302 may generally be constructed in the same manner as the support frame 110, the dynamic mass 130 and the pivotal axis 102 described above with reference to the vibration absorber 100.

In the vibration absorber 300, the torsional spring 350 is positioned along the pivotal axis 302. As shown in the illustrated embodiment, the torsional spring 350 includes a first elastomer element 354 and a second elastomer element 374. The first elastomer element 354 and the second elastomer element 374 may both be generally constructed in the same manner as the elastomer element 150 described above with reference to the vibration absorber 100.

The support frame 310 includes side members 314a, 314b. The side members 314a, 314b each include a hole 316. The first side member 314a includes a semi-circular slot 318a and the second side member 314b includes a semi-circular slot 318b. The dynamic mass 330 includes an arm 332, and the arm 332 has holes 342. The first elastomer element 354 includes an elastomeric disc 355, a first plate 356a and a second plate 356b. The elastomeric disc 355 includes a bore 351. The first and second plates 356a, 356b include corner holes 358 and a center hole 353. The second elastomer element 374 includes an elastomeric disc 375, a third plate 376a and a fourth plate 376b. The elastomeric disc 375 includes a bore 371. The third and fourth plates 376a, 376b include corner holes 378 and a center hole 373.

As best seen in FIG. 7, the shaft 317 extends through the hole 316 of the first side member 314a, the center hole 353 of the first plate 356a, the bore 351, the center hole 353 of the second plate 356b, the holes 342 in the arm 332, the center hole 373 of the third plate 376a, the bore 371, the center hole 373 of the fourth plate 376b, and the hole 316 of the second side member 314b. In other words, in the vibration absorber 300 the elastomer elements 354, 374 are placed in parallel (i.e., with the arm 332 intervening) as contrasted with the serial sequence of the vibration absorber 200. The shaft 317 may also be inserted through bearings positioned in holes 342 in order to reduce the wear on the holes 342 and shaft 317. A washer 347 may also be used. The arm 332 may be attached to the second plate 356b and the third plate 376a via the corner holes 358, 378 by fasteners 377. The bolt 328 in the illustrated embodiment is inserted through the semi-circular slot 318b and another corner hole 378 of the fourth plate 376b and threadedly secured by a nut thus fixing the position of the fourth plate 376b relative to the second side member 314b. A washer 327 may also be used. The first plate 356a may be similarly secured. Positioning of the secured point of the bolt 328 in the semi-circular slot 318b and the corresponding attachment of the first plate 356a further fixes the initial (or rest) rotational position of the arm 332 relative to the support frame 310.

The elastomer elements 354, 374 in the vibration absorber 300 are in parallel as that term is defined herein. Assuming substantially identical elastomer elements, using multiple elastomer elements in parallel may produce a vibration absorber with a higher range of possible natural frequencies $f_n$ than a vibration absorber whose elastomer elements are in series (e.g., vibration absorber 200). This is the expected result as connecting elastomer elements in parallel generally provides a stiffer effective spring rate than such elastomer elements connected in series.

The vibration absorber 300 is illustrated in FIGS. 6 and 7 connected to a pipeline section 392 to form a pipeline system 390. Such a system may similarly be provided using the vibration absorbers 100, 200 of FIGS. 1 through 5. The support frame 310 may be secured to a pipeline section 392 in order to receive vibrations therefrom. The support frame 310 as illustrated in FIG. 6, is secured to the pipeline section 392 by at least one strap assembly 380. Each illustrated strap assembly 380 includes first and second straps 382 received into the slots 320 at one end and secured together by fasteners 384 at an opposite end thereof. A liner 186 (FIG. 2), 386 may be used between the base portion 312 and the pipeline section 392 to protect the pipeline section 392.

In operation, vibrations, such as wind-induced vertical vibrations, of the pipeline section 392 may cause the dynamic mass 330 to move, more particular, to oscillate relative to the support frame 310 by rotating about the pivotal axis 302. These oscillations load and unload the torsional spring 350. The torsional spring 350 and dynamic mass 330 are preferably chosen and configured to provide a natural frequency $f_n$ of the vibration absorber 300 that is substantially coincident with the disturbance frequency $f_d$ of the pipeline section 392 that is excited, for example, by wind passing over the pipeline section 392 while further providing sufficient reactive forces for particular applications. Most preferably, the vibration absorber 300 is configured such that it exhibits the desired natural frequency $f_n$ when subjected to the average daily temperature of the environment in which the vibration absorber 300 will operate in order to reduce any drift in the natural frequency that may occur as a result of temperature variations.

In various embodiments of the present invention, adjustments to the natural frequency $f_n$ may be made in the field by readjusting the position of the adjustment mass 134, 234, 334 on the arm 132, 232, 332 by loosening the bolts 140, 240, 340 and sliding the adjustment mass 134, 234, 334 in or out along the arm 132, 232, 332 and then resecuring it or by adding or removing metal plates 135, 235, 335. Moving the adjustment mass 134, 234, 334 outwardly (i.e., away from the pivotal axis 102, 202, 302) on the arm 132, 232, 332 or adding metal plates 135, 235, 335 generally lowers the natural frequency $f_n$ and, conversely, moving the adjustment mass 134, 234, 334 inwardly on the arm 132, 232, 332 or removing metal plates 135, 235, 335 generally increases the natural frequency $f_n$. As will be understood by those of skill in the art, the range of possible natural frequencies $f_n$ may also be increased by increasing the length of the arm 132, 232, 332 to allow a greater range of displacements of the adjustment mass 134, 234, 334 from the pivotal axis 102, 202, 302. Further adjustments in the natural frequency $f_n$ may be made by adjusting the stiffness of at least one elastomer element 150, 254, 274, 354, 374. Such adjustment to an elastomer element 150, 254, 274, 354,374 may be provided through use of an elastomeric disc 155, 255, 275, 355, 375 manufactured from a different durometer material or in a different geometry (for example but not limited to, varying the thickness). Using elastomer discs 155, 255, 275, 355, 375 of higher durometer or thinner construction generally increases the natural frequency $f_n$. Conversely, using elastomer discs 155, 255, 275, 355, 375 of lower durometer or thicker construction generally decreases the natural frequency $f_n$. Even further adjustments in the natural frequency $f_n$ may be made by combining additional elastomer elements in series (FIG. 4) or in parallel (FIG. 6) with the first elastomer element 150, 254, 354.

By way of example and not limitation, the elastomer element 150, 254, 354 may be comprised of a natural rubber elastomer, a synthetic elastomer or a blend of natural rubber elastomer and synthetic elastomer which is formulated for low temperature spring characteristics. The durometer of the elastomer element 150, 254, 354 when the vibration absorber 100, 200, 300 is applied to a pipeline section 392 is preferably between about 46 and 65 Shore A. It is to be understood that variations in the characteristics of the apparatus to be controlled may affect the preferred range of durometer readings. By way of example and not limitation, the adjustment mass 134, 234, 334 may weigh between about 10 pounds to 90 pounds. Preferably, the arm 132, 232, 332 is manufactured from standard steel and the straps 382 and support frame 110, 210, 310 are made of stamped steel.

As will be understood to those of skill in the art, the vibration absorbers 100, 200, 300 may be referred to as tuned vibration absorbers.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A tuned vibration absorber, for absorbing vibratory disturbances in an object of interest, said tuned vibration absorber comprising:

a support frame;

a tuning mass movably connected to the support frame for movement relative to a pivotal axis, the tuning mass further comprising an arm and an adjustment mass located along the length of the arm and wherein the tuning mass is suspended away from the object of interest, wherein the support frame further comprises means for providing selectable rotational orientation of the tuning mass relative to the support frame; and a torsional spring located along the pivotal axis and positioned between the adjustment mass and the support frame and wherein said torsional spring provides a spring force responsive to pivotal rotation of the tuning mass about the pivotal axis relative to the support frame.

2. The vibration absorber of claim 1 wherein the tuning mass is pivotally connected to the support frame for movement about the pivotal axis.

3. The vibration absorber of claim 2 wherein the torsional spring comprises a coil spring.

4. The vibration absorber of claim 2 wherein the torsional spring comprises a first elastomer element.

5. The vibration absorber of claim 4 wherein the first elastomer element includes a first elastomeric disc.

6. The vibration absorber of claim 5 wherein the first elastomeric disc comprises a material selected from the grouping consisting of natural rubber elastomer, synthetic elastomer and a blend of natural rubber elastomer and synthetic elastomer.

7. The vibration absorber of claim 4 wherein the support frame comprises a first side member and a second side member offset from the first side member along the pivotal axis and wherein the tuning mass is positioned between the first side member and the second side member along the pivotal axis.

8. The vibration absorber of claim 7 wherein the first elastomer element further comprises a first plate and a first elastomeric disc, and wherein the first plate is connected to the first elastomeric disc between the first elastomeric disc and the first side member along the pivotal axis, the first plate being connected to the first side member at a radial position offset from the pivotal axis.

9. The vibration absorber of claim 8 wherein the first side member includes a slot configured to provide selectable rotational orientation of the tuning mass relative to the support frame.

10. The vibration absorber of claim 7 wherein the first side member includes a means for providing selectable rotational orientation of the tuning mass relative to the support frame.

11. The vibration absorber of claim 7 wherein the adjustment mass is moveably mounted on the arm.

12. The vibration absorber of claim 11 wherein the adjustment mass comprises a plurality of metal plates.

13. The vibration absorber of claim 11 wherein the arm comprises a channel having a track formed therein and wherein the adjustment mass is movable along the track to adjust a dynamic characteristic of the vibration absorber.

14. The vibration absorber of claim 13 wherein the first elastomer element is connected between the first side member and the arm.

15. The vibration absorber of claim 13 wherein the first elastomer element further comprises a first plate connected to the first side member at a radial position offset from the pivotal axis, a first elastomeric disc connected to the first plate, and a second plate connected to the first elastomeric disc and to a side of the arm.

16. The vibration absorber of claim 14 wherein the torsional spring further comprises a second elastomer element connected between the second side member and the arm.

17. The vibration absorber of claim 15 wherein the torsional spring further comprises:

a second elastomer element the second elastomer element comprising:

a third plate;

a second elastomeric disc connected to the third plate; and a fourth plate connected to the second elastomeric disc and connected to the second side member at a radial position offset from the pivotal axis; and wherein the third plate is connected to a side of the arm opposite the side of the arm connected to the second plate.

18. The vibration absorber of claim 14 wherein the torsional spring further comprises a second elastomer element connected between the first elastomer element and the arm.

19. The vibration absorber of claim 14 wherein the first elastomer element further comprises:
- a first plate connected to the first side member at a radial position offset from the pivotal axis;
- a first elastomeric disc connected to the first plate; and
- a second plate connected to the first elastomeric disc;
- wherein the torsional spring further comprises a second elastomer element the second elastomer element comprising:
  - a third plate connected to the second plate;
  - a second elastomeric disc connected to the third plate; and
  - a fourth plate connected to the second elastomeric disc and connected to the arm.

20. A tuned vibration absorber comprising:
- a support frame including a first side member and a second side member offset from the first side member;
- a tuning mass including an arm with a first end and a second end and a mass movably mounted on the arm at the second arm end the mass be repositionable relative to the second arm end, the tuning mass first arm end being pivotally connected to the support frame along a pivotal axis that extends between the support frame side members, for movement about the pivotal axis, wherein the support frame further comprises means for providing selectable rotational orientation of the tuning mass relative to the support frame; and
- an elastomer element located along the pivotal axis and connected between the tuning mass at the first arm end and the support frame wherein the elastomer element provides a spring force responsive to pivotal rotation of the tuning mass relative to the support frame wherein the elastomer element is positioned between the first side member and the second side member along the pivotal axis.

21. A tuned vibration absorber comprising:
- a support frame including a first side member and a second side member offset from the first side member;
- a tuning mass including an arm with a first end and a second end and a mass movably mounted on the arm at the second arm end, the arm being pivotally connected to the support frame at the first arm end for movement about a pivotal axis, wherein the support frame further comprises means for providing selectable rotational orientation of the tuning mass relative to the support frame; and
- a plurality of elastomer elements located along the pivotal axis and connected between the tuning mass and the support frame, the plurality of elastomer elements configured to provide a spring force responsive to pivotal rotation of the tuning mass relative to the support frame wherein the plurality of elastomer elements and the tuning mass are positioned between the first side member and the second side member along the pivotal axis.

22. The vibration absorber of claim 21 wherein the plurality of elastomer elements are connected between the first side member and the tuning mass.

23. The vibration absorber of claim 21 wherein at least one elastomer element is connected between the first side member and the arm, and wherein at least one elastomer element is connected between the second side member and the arm.

24. A tuned vibration absorber comprising:
- a support frame;
- a tuning mass pivotally connected to the support frame for movement about a pivotal axis, wherein the support frame further comprises means for providing selectable rotational orientation of the tuning mass relative to the support frame; and
- a cocking spring located along the pivotal axis and connected between the tuning mass and the support frame that provides a spring force responsive to pivotal rotation of the tuning mass relative to the support frame.

25. A vibration-reduced pipeline system comprising:
- a pipeline section;
- a tuned vibration absorber connected to the pipeline section wherein the vibration absorber further comprises
  - a support frame connected to the pipeline section;
  - a tuning mass pivotally connected to the support frame for movement about a pivotal axis, said tuning mass being located away from the pipeline section, wherein the support frame further comprises means for providing selectable rotational orientation of the tuning mass relative to the support frame; and
  - a torsional spring located along the pivotal axis and connected between the tuning mass and the support frame that provides a spring force responsive to pivotal rotation of the tuning mass relative to the support frame.

* * * * *